United States Patent
Zhao et al.

(10) Patent No.: US 12,418,656 B2
(45) Date of Patent: Sep. 16, 2025

(54) CONTEXT ADAPTIVE INTERPOLATION FILTER

(71) Applicant: TENCENT AMERICA LLC, Palo Alto, CA (US)

(72) Inventors: Xin Zhao, San Jose, CA (US); Liang Zhao, Sunnyvale, CA (US); Han Gao, San Diego, CA (US); Yushin Cho, Palo Alto, CA (US); Jing Ye, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 135 days.

(21) Appl. No.: 18/497,697

(22) Filed: Oct. 30, 2023

(65) Prior Publication Data

US 2025/0063171 A1 Feb. 20, 2025

Related U.S. Application Data

(60) Provisional application No. 63/520,295, filed on Aug. 17, 2023.

(51) Int. Cl.
| | |
|---|---|
| *H04N 19/132* | (2014.01) |
| *H04N 19/105* | (2014.01) |
| *H04N 19/176* | (2014.01) |
| *H04N 19/70* | (2014.01) |

(52) U.S. Cl.
CPC ......... *H04N 19/132* (2014.11); *H04N 19/105* (2014.11); *H04N 19/176* (2014.11); *H04N 19/70* (2014.11)

(58) Field of Classification Search
CPC .. H04N 19/176; H04N 19/117; H04N 19/105; H04N 19/132; H04N 19/523; H04N 19/70; H04N 19/82
See application file for complete search history.

(56) References Cited

U.S. PATENT DOCUMENTS

| | | | |
|---|---|---|---|
| 2012/0027079 A1* | 2/2012 | Ye | H04N 19/597 |
| | | | 375/E7.126 |
| 2016/0286230 A1* | 9/2016 | Li | H04N 19/44 |
| 2019/0014342 A1* | 1/2019 | Li | H04N 19/55 |
| 2020/0320159 A1* | 10/2020 | Matthews | C09K 5/10 |
| 2022/0224915 A1* | 7/2022 | Wang | H04N 19/176 |
| 2022/0248006 A1* | 8/2022 | Lim | H04N 19/176 |
| 2022/0311997 A1* | 9/2022 | Huang | H04N 19/159 |

(Continued)

OTHER PUBLICATIONS

International Search Report and Written Opinion of PCT/US23/36377 dated Feb. 20, 2024, 11 pages.

*Primary Examiner* — Neil R Mikeska
(74) *Attorney, Agent, or Firm* — Crowell & Moring LLP

(57) ABSTRACT

This disclosure relates generally to video coding and particularly to methods and systems for deriving context adaptive interpolation filter used for generating prediction samples in inter prediction involving a fractional motion vector or block vector. For example, an encoder and a decoder may derive interpolation filters adaptively using reconstructed samples. The reconstructed samples may belong to templates near a current block and a reference block related by the motion vector or block vector. The derivation of the adaptive interpolation filters may be based on minimizing distortions between interpolated templates associated with the reference block and the templates associated with the current block.

20 Claims, 11 Drawing Sheets

(56) References Cited

U.S. PATENT DOCUMENTS

2022/0417521 A1* 12/2022 Zhang .................. H04N 19/192
2024/0129550 A1* 4/2024 Sánchez De La Fuente ...............
　　　　　　　　　　　　　　　　　　　　　　　H04N 19/91

* cited by examiner

CONTEXT ADAPTIVE INTERPOLATION FILTER

INCORPORATION BY REFERENCE

This application is based on and claims the benefit of priority to U.S. Provisional Patent Application No. 63/520,295 filed on Aug. 17, 2023 and entitled "Context Adaptive Interpolation Filter," which is herein incorporated by reference in its entirety.

TECHNICAL FIELD

This disclosure relates generally to video coding and particularly to methods and systems for deriving context adaptive interpolation filter used for generating prediction samples in inter prediction involving a fractional motion vector or block vector.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

SUMMARY

This disclosure relates generally to video coding and particularly to methods and systems for deriving context adaptive interpolation filter used for generating prediction samples in inter prediction involving a fractional motion vector or block vector. For example, an encoder and a decoder may derive interpolation filters adaptively using reconstructed samples. The reconstructed samples may belong to templates near a current block and a reference block related by the motion vector or block vector. The derivation of the adaptive interpolation filters may be based on minimizing distortions between interpolated templates associated with the reference block and the templates associated with the current block.

In an example implementation, a method for decoding a current block in a video bitstream is disclosed. The method may include receiving from the video bitstream a vector (a motion vector (MV) or a block vector (BV)) identifying a reference block for the current video block; determining a first set of reconstructed samples in a first neighboring template of the current block; determining a second set of reconstructed samples in a second neighboring template of the reference block; determining whether at least one adaptive interpolation filter is applied for the current video block; and in response to the adaptive interpolation filter being applied: deriving the at least one adaptive interpolation filter based on the first set of reconstructed samples and the second set of reconstructed samples; and predicting samples in the current block at least by applying the at least one adaptive interpolation filter to the reference block.

In the example implementations above, determining whether the at least one adaptive interpolation filter is applied for the current block comprises receiving a syntax element from the video bitstream indicating an inter prediction mode for the current block; and determining that the at least one adaptive interpolation filter is applied for the current video block only when the inter prediction mode for the current block is among one of translational inter-prediction modes.

In any one of the example implementations above, determining whether the at least one adaptive interpolation filter is applied for the current block comprises receiving a high-level syntax flag at a sequence, a picture, a subpicture, a slice, or a tile level and determining whether the at least one adaptive interpolation filter is applied based on the high-level syntax flag.

In any one of the example implementations above, the second neighboring template is of a same shape and a same size as the first neighboring template and is located at a same relative position to the reference block as the first neighboring template to the current block.

In any one of the example implementations above, deriving the at least one adaptive interpolation filter comprises deriving the at least one adaptive interpolation filter by minimizing a distortion between the first set of reconstructed samples and an interpolation of the second set of reconstructed samples by the at least one adaptive interpolation filter.

In any one of the example implementations above, deriving the at least one adaptive interpolation filter may include identifying a number of predetermined interpolation filters; applying each of the number of predetermined interpolation filters to the second set of reconstructed samples; and selecting one of the number of predetermined interpolation filters that causes least distortion when applied to the second set of reconstructed samples in comparison to the first set of reconstructed samples.

In any one of the example implementations above, the distortion is quantified by a sum of absolute difference (SAD), a sum of square difference (SSD), a sum of square error (SSE), or a sum of absolute transform domain difference (SATD).

In any one of the example implementations above, deriving the at least one adaptive interpolation filter may include identifying a number of predetermined interpolation filters; applying each of the number of predetermined interpolation filters to the second set of reconstructed samples; selecting a subset of predetermined interpolation filters from the number of predetermined interpolation filters that cause less distortions than other predetermined interpolation filters when applied to the second set of reconstructed samples in comparison to the first set of reconstructed samples; ordering within the subset of predetermined interpolation filters; receiving a signaled index from the video bitstream; and selecting the at least one adaptive interpolation filter from the subset of predetermined interpolation filters as ordered according to the signaled index.

In any one of the example implementations above, the MV or BV points to a fractional pixel position; and the reference block comprises reference samples at integer pixel position closest to the fractional pixel position.

In any one of the example implementations above, determining whether the at least one adaptive interpolation filter is applied for the current block may include determining whether the MV or BV comprises an MV or BV value that falls into a predetermined group of values; and determining that the at least one adaptive interpolation filter is applied for the current o block when the MV or BV value falls into the predetermined group of values.

In any one of the example implementations above, the predetermined group of values comprises fractional pixel values.

In any one of the example implementations above, the at least one adaptive interpolation filter comprises a two-dimensional nonseparable filter.

In any one of the example implementations above, the at least one adaptive interpolation filter comprises separate one-dimensional interpolation filters.

In any one of the example implementations above, the MV or BV points to a fractional pixel position in one or both of a vertical direction and a horizontal direction, the at least one adaptive interpolation filter being applied only in dimensions with factional MV or BV.

In any one of the example implementations above, the method may further include: in response to determining that the adaptive interpolation filter is not applied, applying a predetermined or an explicitly signaled interpolation filter to the reference block to generate the prediction samples for the current block.

In any one of the example implementations above, a number of filter taps of the at least one adaptive interpolation filter is different from a number of taps of the predetermined or the explicitly signaled interpolation filter.

In any one of the example implementations above, a number of filter taps of the at least one adaptive interpolation filter is adaptively determined according to a size of the current block.

In any one of the example implementations above, a shape and/or a position of the first neighboring template and the second neighboring template depends on coded information available to both an encoder and a decoder, the coded information comprising at least one of: a relative position of the current block inside in current picture; a relative position of the current block inside an associated biggest coding block; or coded information associated with one or more adjacent blocks to the current block.

Aspects of the disclosure also provide an electronic device or apparatus including a circuitry or processor configured to carry out any of the method implementations above.

Aspects of the disclosure also provide non-transitory computer-readable mediums storing instructions which when executed by an electronic device, cause the electronic device to perform any one of the method implementations above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more", "at least one", "a", "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

Figure 1:
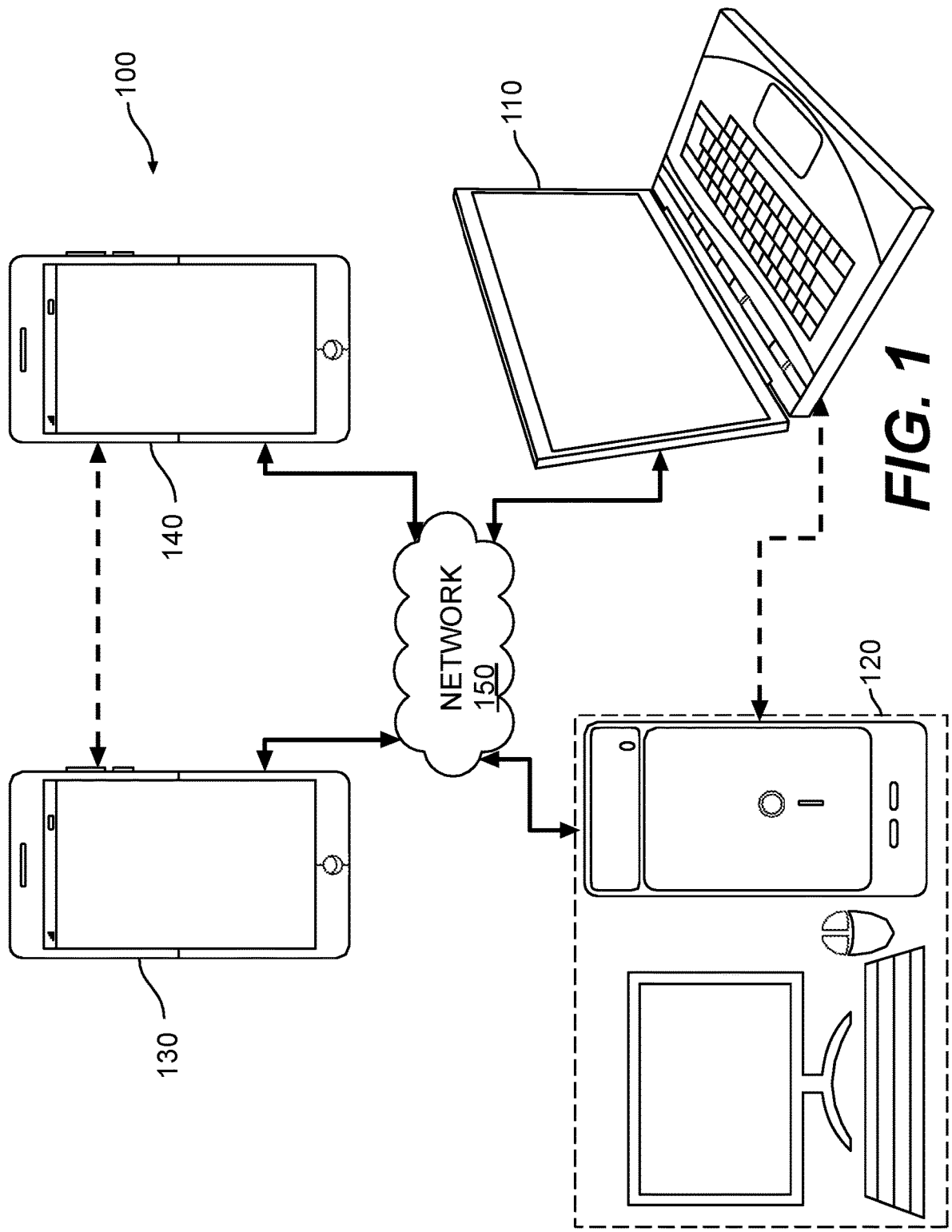
FIG. 1 shows a schematic illustration of a simplified block diagram of a communication system (100) in accordance with an example embodiment.

FIG. 1 illustrates a simplified block diagram of a communication system (100) according to an embodiment of the present disclosure. The communication system (100) includes a plurality of terminal devices, e.g., 110, 120, 130, and 140 that can communicate with each other, via, for example, a network (150). In the example of FIG. 1, the first pair of terminal devices (110) and (120) may perform unidirectional transmission of data. For example, the terminal device (110) may code video data in the form of one or more coded bitstreams (e.g., of a stream of video pictures that are captured by the terminal device (110)) for transmission via the network (150). The terminal device (120) may receive the coded video data from the network (150), decode the coded video data to recover the video pictures and display the video pictures according to the recovered video data. Unidirectional data transmission may be implemented in media serving applications and the like.

In another example, the second pair of terminal devices (130) and (140) may perform bidirectional transmission of coded video data, for example, during a videoconferencing application. For bidirectional transmission of data, in an example, each of the terminal devices (130) and (140) may code video data (e.g., of a stream of video pictures that are captured by the terminal device) for transmission to and may also receive coded video data from another of the terminal devices (130) and (140) to recover and display the video pictures.

In the example of FIG. 1, the terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
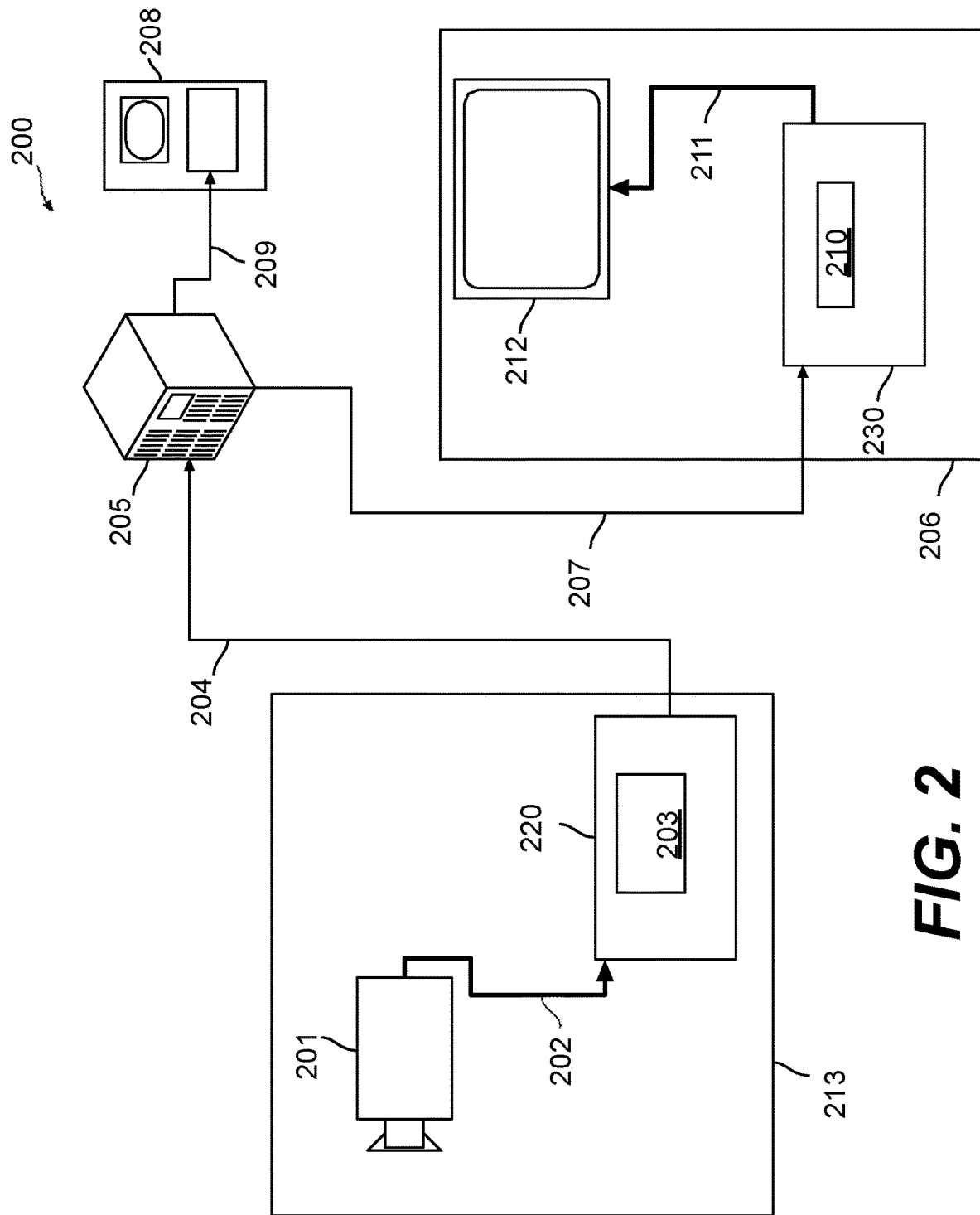
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source 201. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
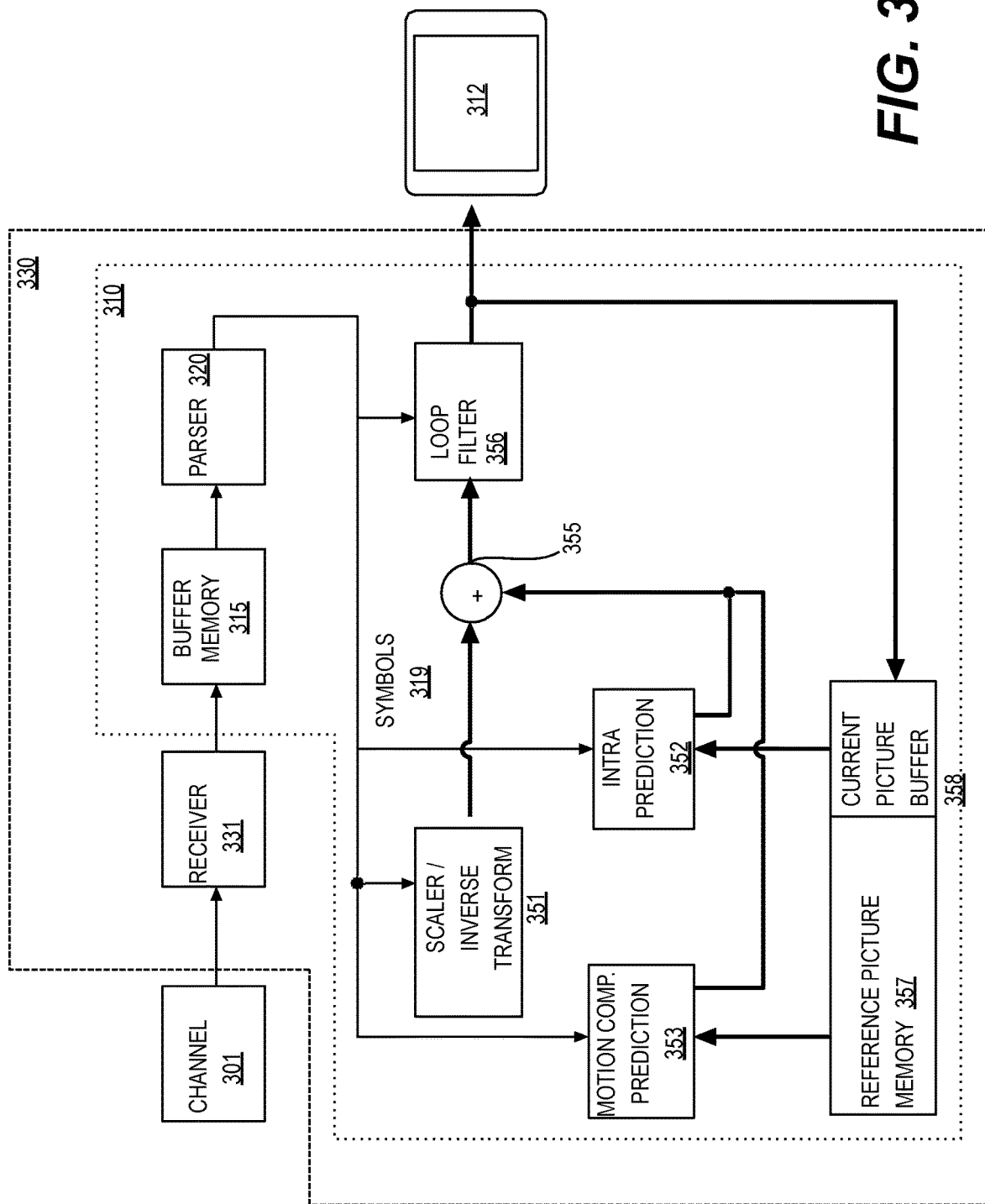
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block. i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
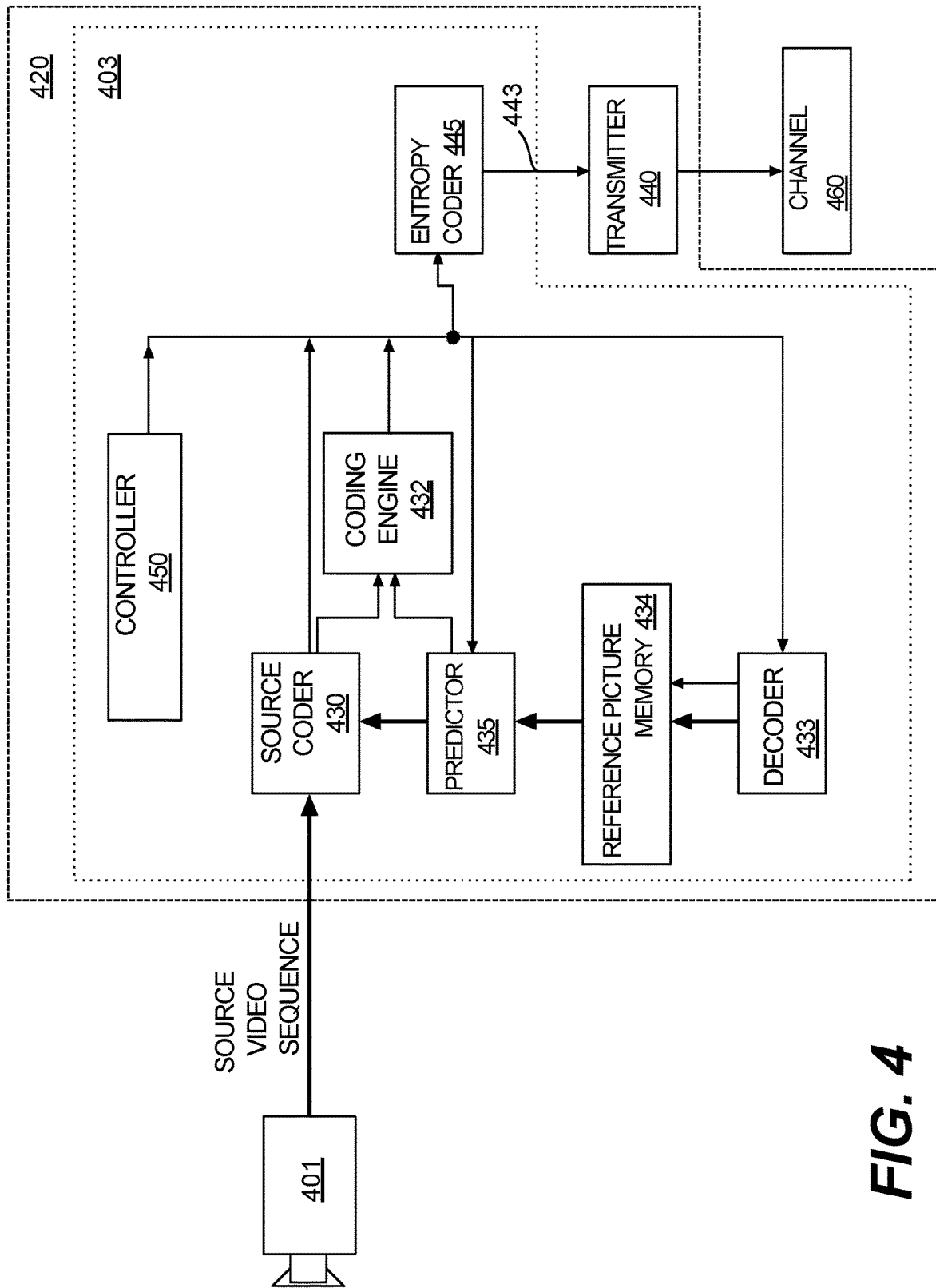
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive pictures. Source pictures commonly may be subdivided spatially into a plurality of sample coding blocks as described in further detail below.

Figure 5:
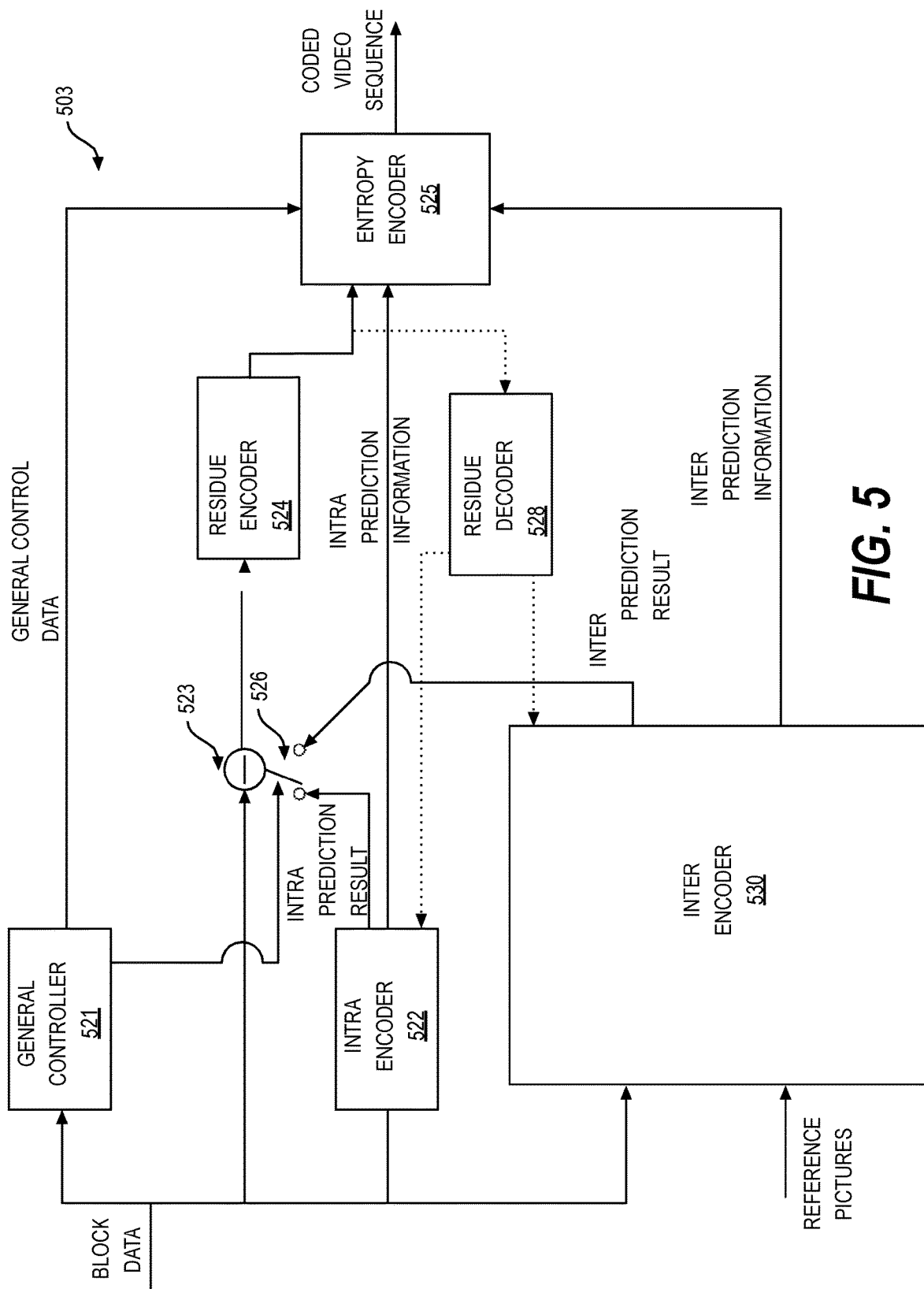
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
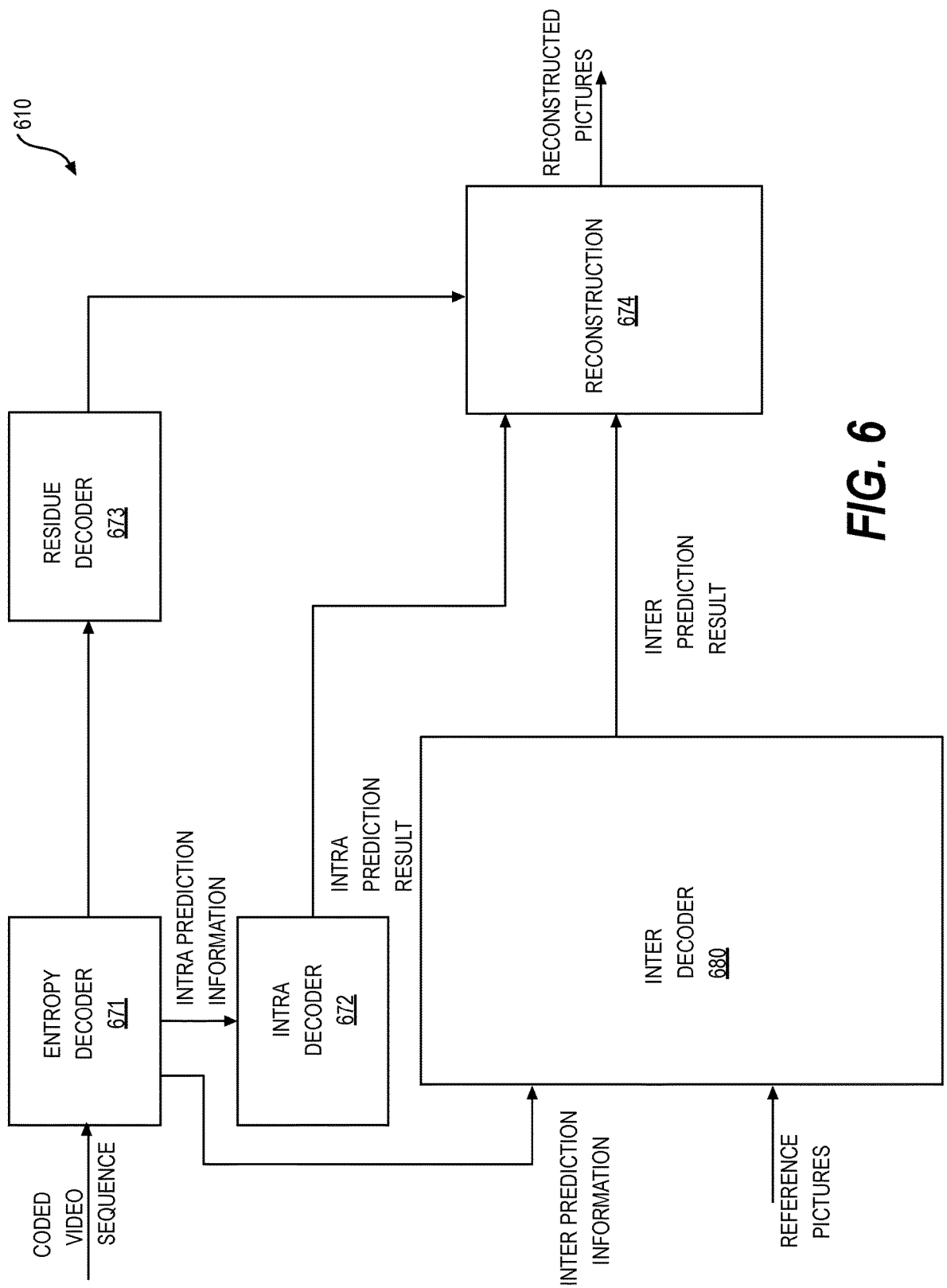
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 7:
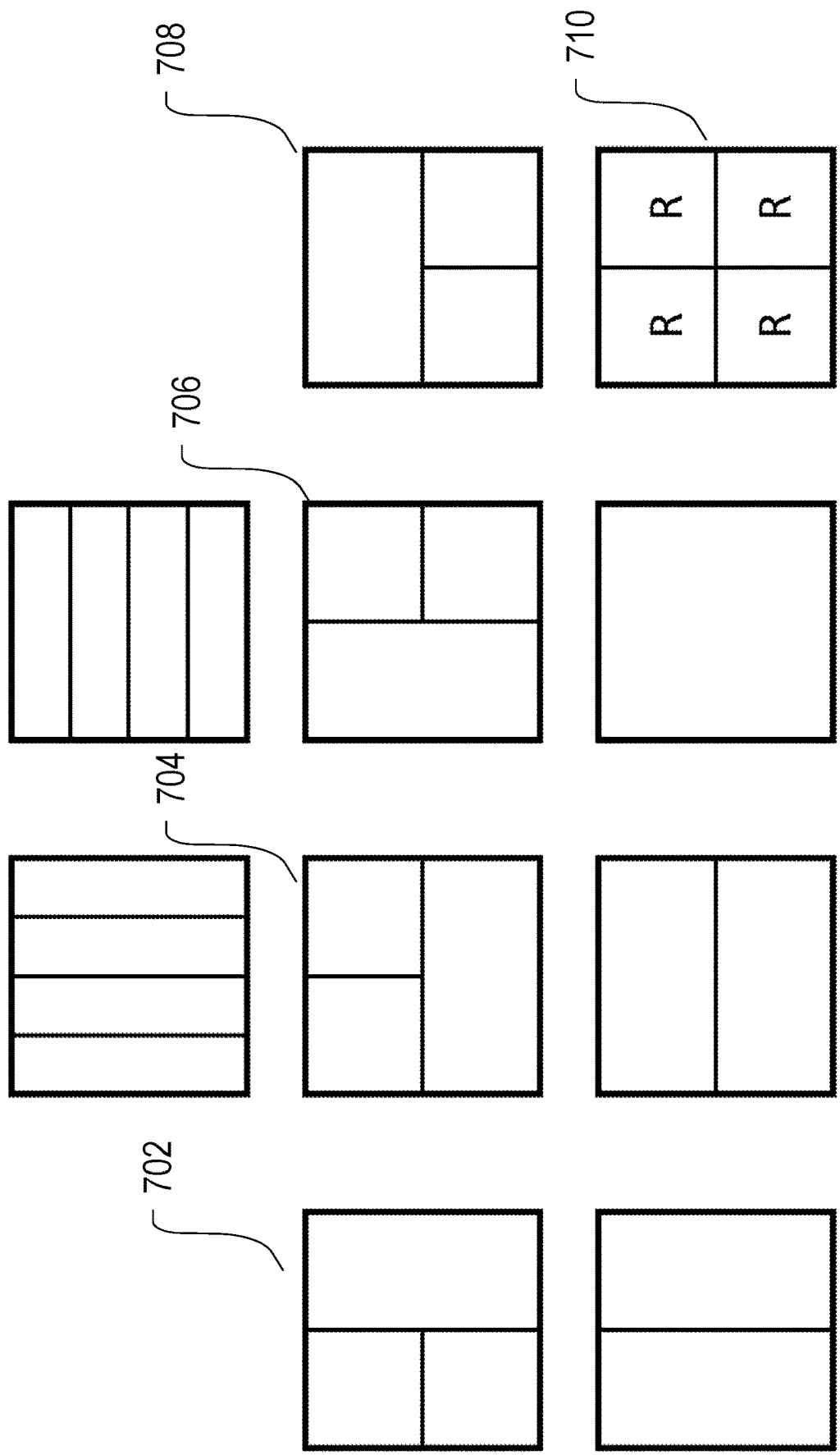
FIG. 7 shows a scheme of coding block partitioning according to example embodiments of the disclosure.

FIG. 7 shows an example predefined 10-way partitioning structure/pattern allowing recursive partitioning to form a partitioning tree. The root block may start at a predefined level (e.g. from a base block at 128×128 or 64×64 level). The example partitioning structure of FIG. 7 includes various 2:1/1:2 and 4:1/1:4 rectangular partitions. In some example implementations, none of the rectangular partitions of FIG. 7 is allowed to be further subdivided. A coding tree depth may be further defined to indicate the splitting depth from the root node or root block. For example, the coding tree depth for the root node or root block may be set to 0, and after the root block is further split once following FIG. 7, the coding tree depth is increased by 1. In some implementations, only the all-square partitions in 710 may be allowed for recursive partitioning into the next level of the partitioning tree following pattern of FIG. 7.

In some other example implementations for coding block partitioning, a quadtree structure may be used. Such quadtree splitting may be applied hierarchically and recursively to any square shaped partitions. Whether a base block or an intermediate block or partition is further quadtree split may be adapted to various local characteristics of the base block or intermediate block/partition.

Figure 8:
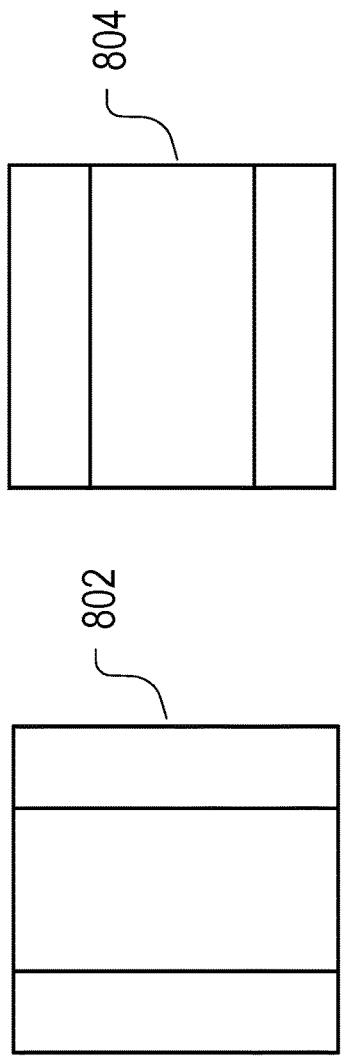
FIG. 8 shows another scheme of coding block partitioning according to example embodiments of the disclosure.

In yet some other examples, a ternary partitioning scheme may be used for partitioning a base block or any intermediate block, as shown in FIG. 8. The ternary pattern may be implemented vertical, as shown in 802, or horizontal, as shown in 804. While the example split ratio in FIG. 8 is shown as 1:2:1, other ratios may be predefined. In some implementations, two or more different ratios may be predefined. In some implementations, the width and height of the partitions of the example triple trees are always power of 2 to avoid additional transforms.

Figure 9:
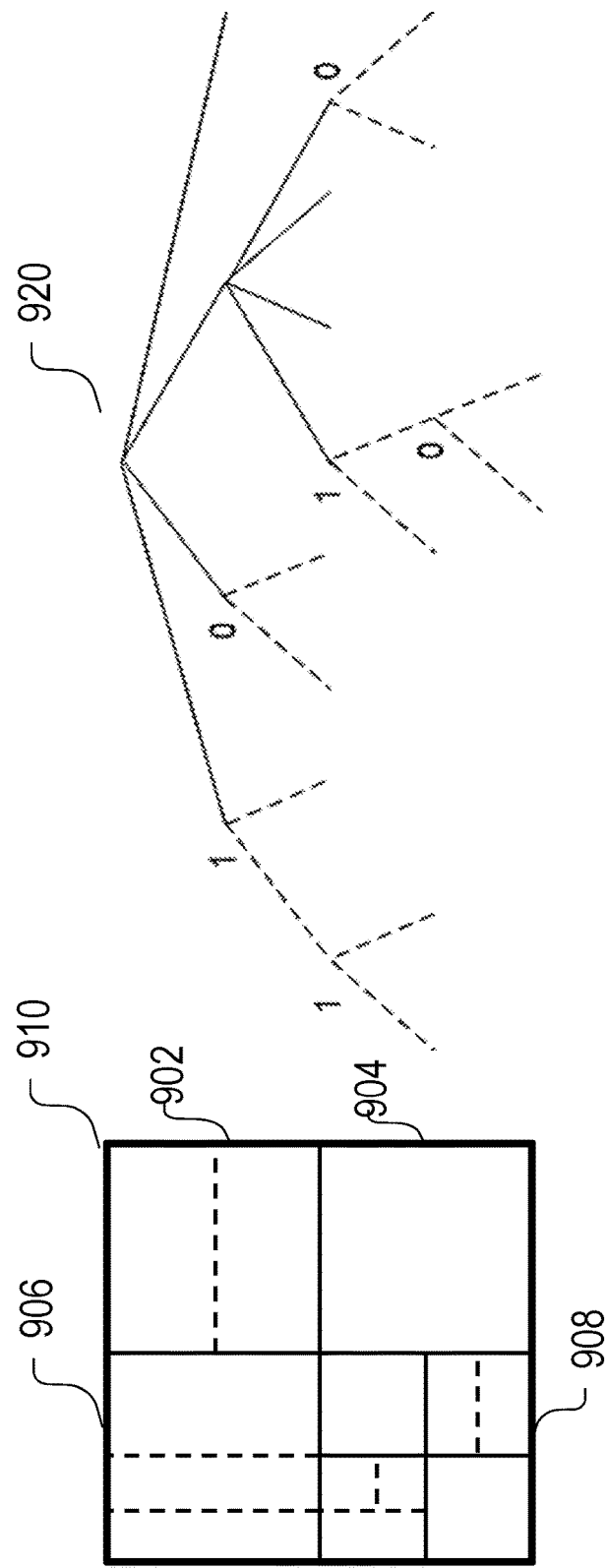
FIG. 9 shows another scheme of coding block partitioning according to example embodiments of the disclosure.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 9, where a base block is first quadtree split into four partitions, as shown by 902, 904, 906, and 908. Thereafter, each of the resulting partitions is either quadtree partitioned into four further partitions (such as 908), or binarily split into two further partitions (either horizontally or vertically, such as 902 or 906, both being symmetric, for example) at the next level, or non-split (such as 904). Binary or quadtree splitting may be allowed recursively for square shaped partitions, as shown by the overall example partition pattern of 910 and the corresponding tree structure/representation in 920, in which the solid lines represent quadtree splitting, and the dashed lines represent binary splitting. Flags may be used for each binary splitting node (non-leaf binary partitions) to indicate whether the binary splitting is horizontal or vertical. For example, as shown in 920, consistent with the partitioning structure of 910, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:

CTU size: the root node size of a quadtree (size of a base block)
MinQTSize: the minimum allowed quadtree leaf node size
MaxBTSize: the maximum allowed binary tree root node size
MaxBTDepth: the maximum allowed binary tree depth
MinBTSize: the minimum allowed binary tree leaf node size In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 9, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

The various CB partitioning schemes above and the further partitioning of CBs into PBs may be combined in any manner. The following particular implementations are provided as non-limiting examples.

Inter-prediction may be implemented, for example, in a single-reference mode or a compound-reference mode. In some implementations, a skip flag may be first included in the bitstream for a current block (or at a higher level) to indicate whether the current block is inter-coded and is not to be skipped. If the current block is inter-coded, then another flag may be further included in the bitstream as a signal to indicate whether the single-reference mode or compound-reference mode is used for the prediction of the current block. For the single-reference mode, one reference block may be used to generate the prediction block for the current block. For the compound-reference mode, two or more reference blocks may be used to generate the prediction block by, for example, weighted average. The reference block or reference blocks may be identified using reference frame index or indices and additionally using corresponding motion vector or motion vectors which indicate shift(s) between the reference block(s) and the current blocks in location relative to a frame. e.g., in horizontal and vertical pixels. For example, the inter-prediction block for the current block may be generated from a single-reference block identified by one motion vector in a reference frame as the prediction block in the single-reference mode, whereas for the compound-reference mode, the prediction block may be generated by a weighted average of two reference blocks in two reference frames indicated by two reference frame indices and two corresponding motion vectors. The motion vector(s) may be coded and included in the bitstream in various manners.

In some example implementations, one or more reference picture lists containing identification of short-term and long-term reference frames for inter-prediction may be formed based on the information in the Reference Picture Set (RPS). For example, a single picture reference list may be formed for uni-directional inter-prediction, denoted as L0 reference (or reference list 0) whereas two picture referenced lists may be formed for bi-direction inter-prediction, denoted as L0 (or reference list 0) and L1 (or reference list 1) for each of the two prediction directions. The reference frames included in the L0 and L1 lists may be ordered in various predetermined manners. The lengths of the L0 and L1 lists may be signaled in the video bitstream. Uni-directional inter-prediction may be either in the single-reference mode, or in the compound-reference mode when the multiple references for the generation of prediction block by weighted average in the compound prediction mode are on a same side of the frame where the block to be predicted is located. Bi-directional inter-prediction may only be compound mode in that bi-directional inter-prediction involves at least two reference blocks.

In some other implementations, the concept of inter-frame prediction may also be applied within a frame. In other words, a reference block for a current block may reside in the same current frame. The location of the reference block relative to the current block in such a situation may be indicated by a block vector (BV), similar to the motion vector (MV) in inter-frame prediction involving a reference frame. A BV or a MV may both referred to as a vector.

In some example implementations, a MV or a BV may point to a fractional position. A fractional MV or BV broadly refers a motion vector or a block vector that contains fractional pixel value therein. In other words, a motion vector or a block vector value may be a fraction of a pixel, an integer of pixels, or a fraction of a pixel plus an integer value of a pixel. When a MV or a BV is non-integer, the corresponding reference block (or prediction block) would be sitting between two or more integer reference blocks and would not be aligned with a block with known pixel values. As such, the reference block or prediction block corresponding to a fractional MV or BV need to be derived rather than copied from the existing reference samples. In the disclosure below, an MV or BV may be described as being either integer-pel and fractional-pel. The terms "integer-pel" or "fractional-pel" are interchangeably used with and are identical to the terms full-pel and sub-pel, respectively.

In some example implementations, such derivation or generation of prediction samples may be performed via an interpolation filter operated on reference samples at integer positions. Specifically, two or more integer reference blocks near the fractional reference block and with existing reference samples may be interpolated to generate the fractional reference samples as prediction samples for the current block. The interpolation filter, for example, may be characterized by a number to taps (number of neighboring samples at integer pixel locations and involved in the interpolation) and filtering coefficients.

Such interpolative generation of reference samples at fractional pixel positions may be needed in either horizontal direction, vertical direction, or both horizontal and vertical directions. For example, when the BV or MV points to a prediction block located with integer horizontal pixel coordinate and fractional vertical pixel coordinate, an interpolation filter may be applied at the vertical direction and interpolation in the horizontal direction may not be needed. When the BV or MV points to a prediction block located with integer vertical pixel coordinate and fractional horizontal pixel coordinate, an interpolation filter may be applied along the horizontal direction and interpolation in the vertical direction may not be needed. When the BV or MV points to a prediction block located with fractional horizontal pixel coordinate and fractional vertical pixel coordinate, an interpolation filter may be applied along both horizontal and vertical directions. The application of the interpolation filtering in both the horizontal and vertical directions may be applied either sequentially using separable interpolation filters or at the same time using a non-separable interpolation filter. Likewise, the one-dimensional separable interpolation filters or non-separable two-dimensional interpolation filters may be designed for generating reference samples for inter prediction.

In some example implementations, such interpolation filters may be predetermined for MV or BV of different pixel fractions. For example, one or more interpolation filters of predetermined number of taps may be predefined for ½ pel. Likewise, one or more interpolation filters of predetermined number of taps may be predefined for ¼ pel, and so one. These predefined interpolation filters may be grouped by pixel fractions and indexed within each fraction. An encoder may select an interpolation filter based on the fractional value of the MV or BV and signal the index of the selected interpolation filter in the bitstream. The decoder may correspondingly first extract and determine the fraction value for the MV or BV and then determine the predetermined interpolation filter to use based on the fraction value and the signaled index. In some implementations, interpolation filter for a particular for deriving reference samples for a BV or MV with a particular pixel fraction may be fixed and predefined, thereby needing no singling for any index.

As the effectiveness of interpolation filters is crucial for achieving high inter prediction accuracy, pre-defined fixed interpolation filters may not be sufficiently adaptive to accommodate different statistics of dynamic image and video content to achieve better possible coding efficiency. As such, other alternative ways of using adaptively and dynamically generated interpolation filters may be desirable in providing closer prediction blocks and prediction samples. In these alternatively implementations, considerations may also be given for not excessively increasing signaling overhead.

In some other example implementations, templates of a current block and templates of a corresponding reference block may be defined and then used to derive the interpolation filter described above, which, as described in further detail below, provides adaptability in interpolation filters and efficient signaling.

Figure 10:
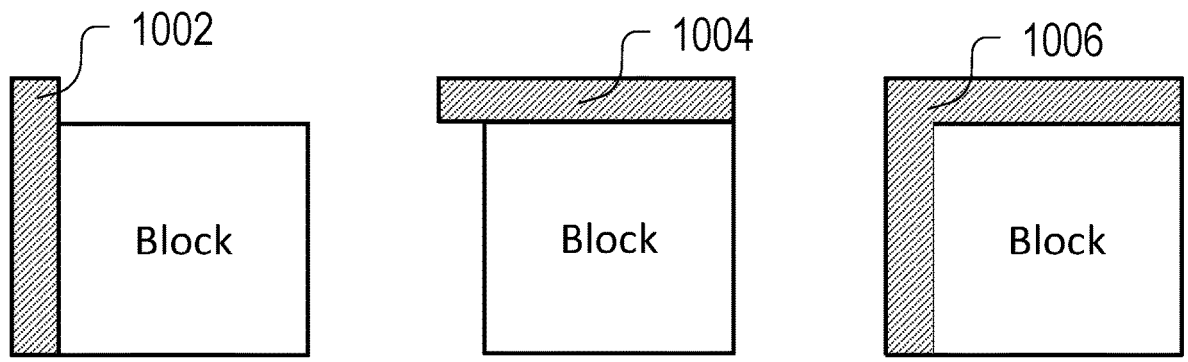
FIG. 10 illustrates examples of templates of a block.

A template of a block (either a current block or a reference block) is defined as a group of available neighboring reconstructed samples of the said block. Examples of templates may each include one or multiple lines of top reference samples, or one or multiple lines of left reference samples, or one or multiple lines of top and left reference samples (i.e., inverted L shape), as shown in FIG. 10. Specifically, in FIG. 10, three example template shapes for a block 1001 are shown as 1002, 1004, and 1006, including one or multiple reconstructed left, top, and both left and top neighboring lines, respectively.

Templates can be defined for any block. For the case of inter prediction, both the templates of current block and the templates of the reference blocks may be defined and are illustrated as 1102 and 1104 in FIG. 11. In some example implementations, the shapes of templates for the reference blocks and the current blocks may be defined as the same for some purposes. For example, they may both use left template, or right template, or inverted L shaped template shown in FIG. 10. For some other purposes, the shapes of templates for the reference blocks and the current blocks may need not be the same.

In some example implementations for adaptive derivation of interpolation filters in inter prediction, reconstructed samples in templates of a current block and templates of reference block of the current block may be used to adaptively derive one or multiple interpolation filters that is/are used for generating the prediction sample values in the prediction block (particularly at fractional positions). The derived prediction block with prediction samples is then used for generating residual values for the current block for coding. The manner in which the interpolation filters are derived may be defined such that the encoder and decoder follow the same procedures. As such, explicit signaling of the interpolation filters in the bitstream is reduced or avoided.

In some example implementations, the implementations above and implementations further described below for adaptive interpolation filters derivation in inter prediction may be applied only to specific coding modes. For example, these methods may only apply to prediction mode that use translational motion. i.e., the same BV/MV for all the samples in the current block. For general warped inter prediction modes, for example, adaptive interpolation filters derivation may not be adopted. In such implementations, a decoder may, in response to receiving a syntax element in the bitstream indicating an inter prediction mode for a block where adaptive interpolation filter is applied, would then generate the interpolation filters from the templates of the current block and the templates of the reference block. Otherwise, the decoder would extract information about the interpolation filter from the signaling in the bitstream or use method in prediction modes (such as warped mode) that are inherently fractional.

In some example implementations, whether the adaptive interpolation filter derivation methods above and further described below are adopted may be signaled in a high-level syntax flag in the bitstream, including but not limited to, sequence/picture/subpicture/slice/tile-level flag. An encoder thus may determine whether such adaptive interpolation filtering is to be adopted and include syntax element in the bitstream indicate whether it is adopted or is not adopted at any one of the various signaling levels. A decoder would then receive the syntax element and determine whether the adaptive interpolation filtering is adopted. If it is, the decoder would then derive the interpolation filters from the templates of the current block and the templates of the reference block. Otherwise, the decoder would extract information about the interpolation filter from the signaling in the bitstream.

The adaptive interpolation filter derivation methods above and described in further detail below apply to both inter-frame and intra-frame block-level prediction. In other words, the reference block may be in the same picture as the current block, as located by a BV. Alternatively, the reference block may be in a different picture ad located by a MV, which indicates an inter prediction.

In some example implementations, the derivation of the one or more interpolation filters based on the template of the current block and the template of the reference block of the current block (as specified via the BV or MV of the current block) may involve an optimization process for deriving an interpolation filter adaptively by finding the adaptive interpolation filter that, when applied to the template of the reference block, generates a reference template (presumably at a fraction pixel neighboring position of the reference block) with minimal difference from the template of the current block. The optimization process, for example, may involve a least mean square method. As such, the example least mean square optimization procedure may be applied using the templates of reference block and current block to derive the interpolation filter coefficients that provide the minimum distortion between the current block template and a template interpolated from the integer templates of reference block. The interpolation filter may be initialized, and then optimized in multiple iterations to minimize the difference described above.

In the above implementations, the template for the reference block may be located using the MV or the BV relative to the template of the current block. The samples used for interpolation in the reference template at integer positions near and around a fractional template location (when the BV or MV is fractional) may be determined by the filter shape. The example implementations above presumes that the interpolation filters derived based on the template of the blocks would to a certain extent accurately represent the interpolation filter that can be applied to the samples near the reference block samples at fractional pixel positions.

In some example implementations, the distortion between interpolated reference template samples and the current template samples in the optimization procedure above or other optimization procedure for deriving the adaptive interpolation filter may be measured by pre-defined metrics, including, but not limited to sum of absolute difference (SAD), sum of square difference (SSD), sum of square error (SSE), sum of absolute transform domain difference (SATD).

In some example implementations, when the BV or MV is fractional, it points to fractional position. An integer position near the fractional positions pointed to by the BV and MV may be used as a reference block. The reference block thus may be associated with known reconstructed samples. The reference block may be determined with respect to the fractional position using a predetermined rule. For example, the integer position of the reference block may be the closest to the fractional position. For another example, the reference block may be the block at the next integer position along certain predetermined direction from the fractional position. The reference block is eventually interpolated by the interpolation filter to generate the prediction samples.

In some example implementations, a group of candidate interpolation filters may be pre-defined for an adaptive selection, and the interpolation filter that provides the minimum distortion between the current block template and a template interpolated from the template of reference block may be selected as the interpolation filter to be used for generating prediction samples. In such implementations, the computation burden on the decoder may be reduced while still providing some amount of adaptability without having to signal the selection of the interpolation filter in the bitstream. In these example implementations, the distortion, for example, may be measured by pre-defined metrics, including, but not limited to SAD. SSE, and SATD.

In some example implementations. M interpolation filters may be predefined for adaptive selection. These predefined filters may be applied to reference templates for matching the current template, and the N out of M (where N is smaller than or equal to M) predefined interpolation filters that have better matching may be selected based on distortion of the templates. These N interpolation filters may be order with respect to distortion (e.g., higher ranking for lower distortion). For M=N, the interpolation filters only need to be reordered. An index may be explicitly signaled in the bitstream to indicate which filter out of the N interpolation filters is finally used for the current block. As such, both the encoder and the decoder are aware of the M predefined interpolation filters, and follow the same distortion calculation process to adaptively select and order the N interpolation filters among the M predefined interpolation filters. The encoder may further select an interpolation filter from the N ordered interpolation filters and signal its index in the bitstream. The decoder may correspondingly extract the index from the bitstream and lookup the selected interpolation filter from the N interpolation filters through its own distortion calculation process, and apply the selected interpolation filter to generate the prediction block with prediction samples. In these example implementations, the computation burden on the decoder may be reduced while still providing some amount of adaptability using a smaller index to signal in the bitstream. These implementations also allow the encoder to overcome a portion of possible inaccuracy in approximating interpolation filters applied to the reference blocks using interpolation filters derived from the templates, by selecting from the N interpolation filters based on optimal performance on the actual reference block in comparison to the current block. Such selection process from N interpolation filters can be performed by the encoder. Although such selection cannot be performed by the decoder (because the current block has not been reconstructed), the decoder needs not to perform such selection evaluation anyway, because the interpolation filter selected from the N interpolation filters is signaled in the bitstream. In these example implementations, the distortion, for example, may be measured by pre-defined metrics, including, but not limited to SAD, SSE, and SATD.

In any one of the example implementations above and the implementations described in further detail below, when applying an interpolation filter to generate a reference template at fractional position (referred to as template_fractional) to be compared with the current template for distortion determination, the templates of the reference block to which the interpolation filter is applied include multiple templates at integer positions at the reference block, referred to as template_integer.

In some example implementations, the adaptive interpolation filter derivation above or in other implementations described further below may be applied selectively. For example, adaptive interpolation filtering may be applied to certain MV or BV values, e.g., adaptive interpolation filtering may be applied when the BV and/or MV points to one of a group of predefined integers and/or fractional positions. For other BV or MV pointing to other values, fixed or explicitly signaled interpolation filters may be applied. For example, for BV or MV values where fixed or predefined interpolation filters work well statistically may not need to be forced to involve adaptive interpolation filter derivation above. That way, the decoder only needs to perform adaptive distortion calculations in situations where the BV or the MV falls into the predefined value group, which provide substantial coding gain statistically. In such example implementations, the decoder would be able to determine from the BV and MV values whether to perform adaptive derivation or selection of the interpolation filters or use fixed or explicitly signaled interpolation filters.

For example, the adaptive interpolation filtering above may be applied only when the BV and/or MV points to fractional position, but not integer position.

For another example, the adaptive interpolation filtering above may be applied only when the BV and/or MV is pointing to $\frac{1}{2}$-pel position.

For another example, the adaptive interpolation filtering above may be applied only when the BV and/or MV is pointing to $\frac{1}{4}$-pel position.

For another example, the adaptive interpolation filtering above may be applied only when the BV and/or MV is pointing to $\frac{1}{8}$-pel position.

For another example, the adaptive interpolation filtering above may be applied only when the BV and/or MV is pointing to $\frac{1}{16}$-pel position.

For another example, the adaptive interpolation filtering above may be applied only when the BV and/or MV is pointing to $\frac{1}{32}$-pel position.

For yet another example, the adaptive interpolation filtering above may be applied only when the BV and/or MV is pointing to any one of the fractional positions above and smaller.

For yet another example, the adaptive interpolation filtering above may be applied only when the BV and/or MV is pointing to any groups of the fractional positions above.

Turning to the interpolation filters, in some example implementations, when the adaptive interpolation filtering above and in the other implementations further described below is adopted, one-dimensional or two-dimensional interpolation filters may be used. In other words, input to the interpolation filters involves multiple rows and/or multiple columns of reference samples.

For example, when the BV/MV points to a fractional horizontal coordinate and an integer vertical coordinate, a one-dimensional interpolation filter is adaptively derived (when adaptive interpolation is adopted) and applied to the reference samples to generate the prediction samples.

For another example, when the BV/MV points to a fractional vertical coordinate and an integer horizontal coordinate, a one-dimensional interpolation filter is adaptively derived (when adaptive interpolation is adopted) and applied to the reference samples to generate the prediction samples.

For another example, when the BV/MV points to a fractional vertical coordinate and a fractional horizontal coordinate, a two-dimensional interpolation filter is adaptively derived (when adaptive interpolation is adopted) and applied to the reference samples to generate the prediction samples. The two-dimensional interpolation filter may be non-separate filter that applies in both dimensions in the at the same time, or may be separable filters that applies sequentially.

In some example implementations, when the adaptive interpolation filtering above and in the other implementations further described below is adopted, horizontal interpolation filter(s) and a vertical interpolation filter(s) may be derived separately.

For example, when the adaptive interpolation filtering above and in the other implementations further described below is adopted and when the BV/MV is pointing to a fractional vertical coordinate, the separately derived vertical interpolation filter above is used to perform the vertical interpolation filtering.

For another example, when the adaptive interpolation filtering above and in the other implementations further described below is adopted and when the BV/MV is pointing to a fractional horizontal coordinate, the separately derived horizontal interpolation filter above is used to perform the horizontal interpolation filtering.

For another example, when adaptively and separately deriving vertical interpolation filters, either top or left template, or both top and left templates can be used, as illustrated in FIG. 10 as an example.

For another example, when adaptively and separately deriving horizontal interpolation filters, either top or left template, or both top and left templates can be used, also as illustrated in FIG. 10 as an example.

Turning to shapes of the interpolation filters, in some example implementations, a number of filter taps using in an adaptively derived interpolation filter can be different from a number of filter taps for interpolation filters when the adaptive interpolation filter derivation is not applied (e.g., pre-defined or hard coded fixed or explicitly signaled interpolation filters are being used). For example, for adaptively derived filters, the number of filter taps may be further adaptive in that it may depend on, for example, a size of the coding block.

In some example implementations, the selection of templates for adaptive derivation of the interpolation filter may adaptively depend on coded information or any other information that is available to both encoder and decoder. The dependence may be predefined and known to both the encoder and the decoder such that consistent templates are used when deriving the adaptive interpolation filters on both sides. Such coded information or other information may be known to both the encoder and decoder. Such coded information or other information may include but is not limited to the relative position of a block inside the picture (e.g., whether the block is located at the top, right, bottom and left picture boundary), the relative position of a block inside the associated biggest coding block (e.g., whether the block is located at the top, right, bottom and left boundary of the associated biggest coding block). Additionally, or alternatively, such coded information and other information may include but is not limited to information pertaining to adjacent blocks of the current blocks. Alternatively, information pertaining to up to T column/row non-adjacent blocks to the current blocks may also be included for adaptive determination of the selection of the templates.

For example, the above adaptive selection of templates may involve a selection of different template shapes. e.g., left template, top template and the inverted L-shape template (as shown in FIG. 10), or sizes of the template (number of neighboring lines, for example).

Figure 12:
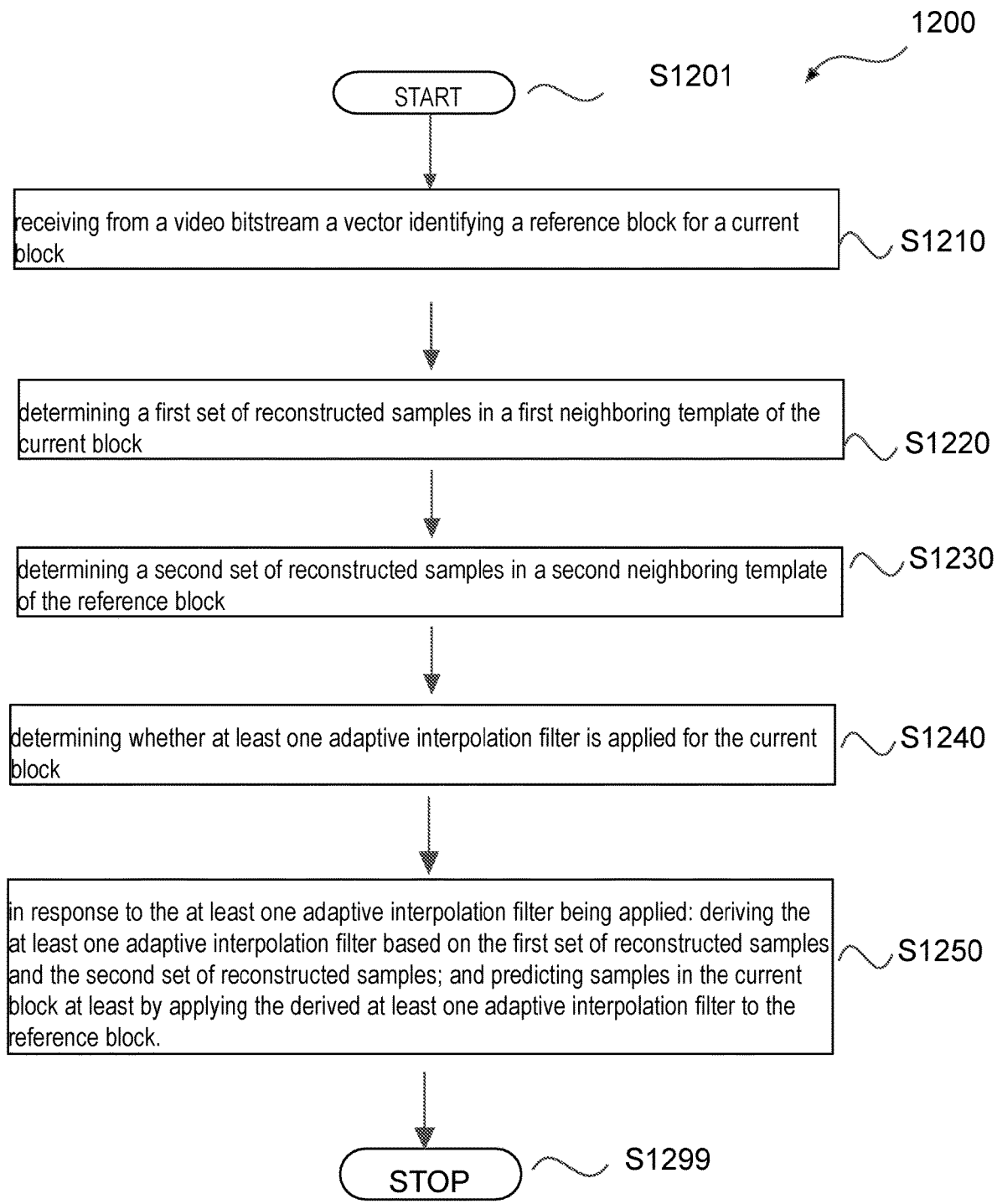
FIG. 12 shows an example logic flow for a method for signaling of an optical flow refinement flag and compound inter prediction mode.

FIG. 12 illustrates an example logic flow 1000 according the implementations above. The logic flow 1200 starts at S1201. In S1210, a vector (motion vector (MV) or a block vector (BV)) is received for the current video block from a video bitstream, the vector identifying a reference block for the current block. In S1220, a first set of reconstructed samples in a first neighboring template of the current video block are determined. In S1230, a second set of reconstructed samples in a second neighboring template of the reference video block are determined. In S1240, it is determined whether at least one adaptive interpolation filter is applied for the current video block. In S1250, in response to determining that the adaptive interpolation filter is applied: the at least one adaptive interpolation filter is derived based on the first set of reconstructed samples and the second set of reconstructed samples; and samples in the current block are predicted at least by applying the derived tat least one adaptive interpolation filter to the reference block. The logic flow 1000 stops at S1299.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height:width) of the block.

Figure 11:
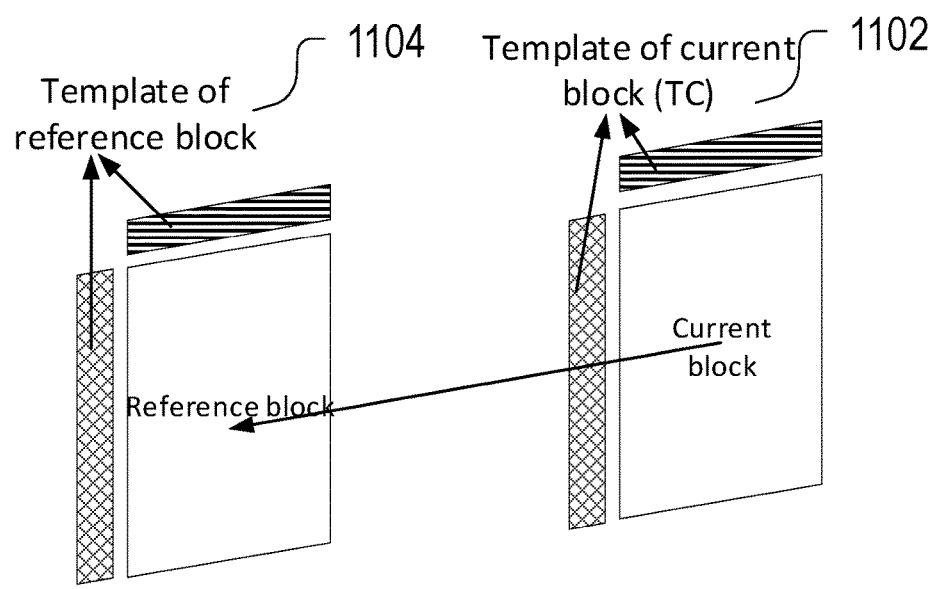
FIG. 11 illustrates example templates of a current block and a corresponding reference block.

The techniques described above, can be implemented as computer software using computer-readable instructions and physically stored in one or more computer-readable media. For example, FIG. 11 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
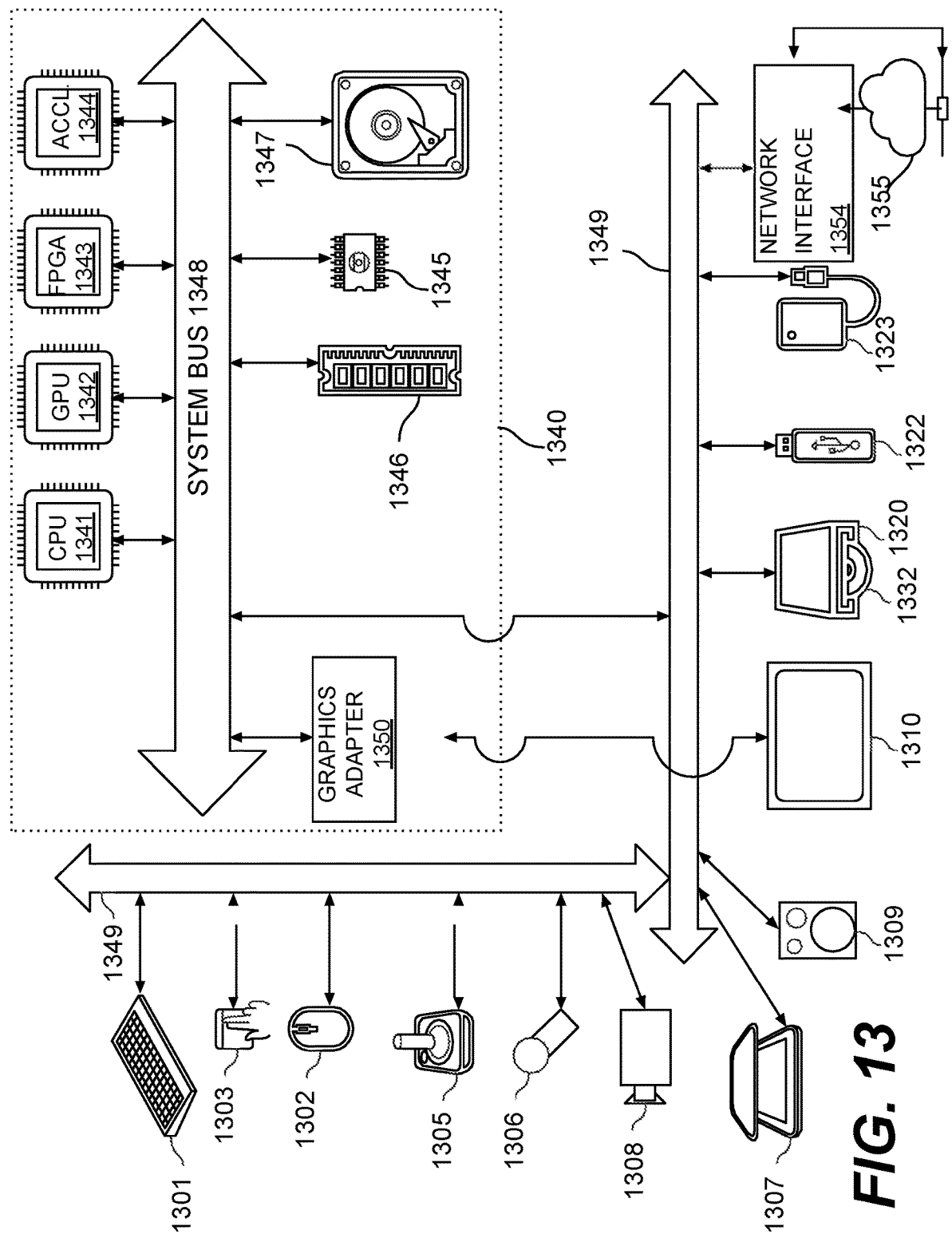
FIG. 13 shows a schematic illustration of a computer system in accordance with example embodiments of this disclosure.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a current block in a video bitstream, the method comprising:
    receiving from the video bitstream a vector identifying a reference block for the current block;
    determining a first set of reconstructed samples in a first neighboring template of the current block;
    determining a second set of reconstructed samples in a second neighboring template of the reference block;
    determining whether at least one adaptive interpolation filter is applied for the current block; and
    in response to the at least one adaptive interpolation filter being applied:
        deriving the at least one adaptive interpolation filter based on the first set of reconstructed samples and the second set of reconstructed samples; and
        predicting samples in the current block at least by applying the derived at least one adaptive interpolation filter to the reference block.
2. The method of claim 1, wherein:
    the vector points to a fractional pixel position; and
    the reference block comprises reference samples at integer pixel position closest to the fractional pixel position.
3. The method of claim 1, wherein determining whether the at least one adaptive interpolation filter is applied for the current block comprises:
    receiving a syntax element from the video bitstream indicating an inter prediction mode for the current block; and
    determining that the at least one adaptive interpolation filter is applied for the current block only when the inter prediction mode for the current block is among one of translational inter-prediction modes.
4. The method of claim 1, wherein determining whether the at least one adaptive interpolation filter is applied for the current block comprises receiving a high-level syntax flag at a sequence, a picture, a subpicture, a slice, or a tile level and determining whether the at least one adaptive interpolation filter is applied based on the high-level syntax flag.
5. The method of claim 1, wherein the second neighboring template is of a same shape and a same size as the first neighboring template and is located at a same relative position to the reference block as the first neighboring template to the current block.
6. The method of claim 5, wherein deriving the at least one adaptive interpolation filter comprises deriving the at least one adaptive interpolation filter by minimizing a distortion between the first set of reconstructed samples and an interpolation of the second set of reconstructed samples by the at least one adaptive interpolation filter.
7. The method of claim 6, wherein the distortion is quantified by a sum of absolute difference (SAD), a sum of square difference (SSD), a sum of square error (SSE), or a sum of absolute transform domain difference (SATD).
8. The method of claim 6, wherein deriving the at least one adaptive interpolation filter comprises:
    identifying a number of predetermined interpolation filters;
    applying each of the number of predetermined interpolation filters to the second set of reconstructed samples; and
    selecting one of the number of predetermined interpolation filters that causes least distortion when applied to the second set of reconstructed samples in comparison to the first set of reconstructed samples.
9. The method of claim 8, wherein the distortion is quantified by a sum of absolute difference (SAD), a sum of square difference (SSD), a sum of square error (SSE), or a sum of absolute transform domain difference (SATD).
10. The method of claim 6, wherein deriving the at least one adaptive interpolation filter comprises:
    identifying a number of predetermined interpolation filters;
    applying each of the number of predetermined interpolation filters to the second set of reconstructed samples;
    selecting a subset of predetermined interpolation filters from the number of predetermined interpolation filters that cause less distortions than other predetermined interpolation filters when applied to the second set of reconstructed samples in comparison to the first set of reconstructed samples;
    ordering within the subset of predetermined interpolation filters;
    receiving a signaled index from the video bitstream; and
    selecting the at least one adaptive interpolation filter from the subset of predetermined interpolation filters as ordered according to the signaled index.

11. The method of claim 1, wherein determining whether the at least one adaptive interpolation filter is applied for the current block comprises:
  determining whether the vector comprises a vector value that falls into a predetermined group of values; and
  determining that the at least one adaptive interpolation filter is applied for the current block when the vector value falls into the predetermined group of values.

12. The method of claim 11, wherein the predetermined group of values comprises fractional pixel values.

13. The method of claim 1, wherein the at least one adaptive interpolation filter comprises a two-dimensional nonseparable filter or separate one-dimensional interpolation filters.

14. The method of claim 1, wherein the vector comprises a motion vector or a block vector.

15. The method of claim 1, wherein the vector points to a fractional pixel position in one or both of a vertical direction and a horizontal direction, the at least one adaptive interpolation filter being applied only in dimensions with a factional vector.

16. The method of claim 1, further comprising: in response to determining that the adaptive interpolation filter is not applied, applying a predetermined or an explicitly signaled interpolation filter to the reference block to generate the predicted samples for the current block.

17. The method of claim 16, wherein a number of filter taps of the at least one adaptive interpolation filter is different from a number of taps of the predetermined or the explicitly signaled interpolation filter.

18. The method of claim 1, wherein a number of filter taps of the at least one adaptive interpolation filter is adaptively determined according to a size of the current block.

19. The method of claim 1, wherein a shape and/or a position of the first neighboring template and the second neighboring template depends on coded information available to both an encoder and a decoder, the coded information comprising at least one of:
  a relative position of the current block inside in current picture;
  a relative position of the current block inside an associated biggest coding block; or
  coded information associated with one or more adjacent blocks to the current block.

20. An electronic device, comprising a memory for storing instructions, and a processor for executing the instructions to:
  receive from a video bitstream a vector identifying a reference block for a current block;
  determine a first set of reconstructed samples in a first neighboring template of the current block;
  determine a second set of reconstructed samples in a second neighboring template of the reference block;
  determine whether at least one adaptive interpolation filter is applied for the current block; and
  in response to the at least one adaptive interpolation filter is applied:
    derive the at least one adaptive interpolation filter based on the first set of reconstructed samples and the second set of reconstructed samples; and
    predict samples in the current block at least by apply the derived at least one adaptive interpolation filter to the reference block.

* * * * *